(12) United States Patent
Vick, Jr. et al.

(10) Patent No.: US 11,203,917 B2
(45) Date of Patent: Dec. 21, 2021

(54) EQUALIZING DEVICE FOR SAFETY VALVES

(71) Applicant: Halliburton Energy Services, Inc., Houston, TX (US)

(72) Inventors: James Dan Vick, Jr., Dallas, TX (US); Cody Loy Campbell, Richardson, TX (US); Jimmie Robert Williamson, Carrollton, TX (US); Bharat B. Pawar, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/774,703

(22) Filed: Jan. 28, 2020

(65) Prior Publication Data

US 2020/0256159 A1 Aug. 13, 2020

(51) Int. Cl.
*E21B 34/10* (2006.01)
*F16K 17/04* (2006.01)

(52) U.S. Cl.
CPC ........ *E21B 34/101* (2013.01); *F16K 17/0486* (2013.01)

(58) Field of Classification Search
CPC .............. E21B 34/101; E21B 2200/05; E21B 2200/06; F16K 17/0486
See application file for complete search history.

(56) References Cited

U.S. PATENT DOCUMENTS

| | | | |
|---|---|---|---|
| 3,071,151 A * | 1/1963 | Sizer | E21B 34/08 137/496 |
| 3,845,818 A * | 11/1974 | Deaton | E21B 34/105 166/322 |
| 4,415,036 A | 11/1983 | Carmody et al. | |
| 4,478,286 A | 10/1984 | Fineberg | |
| 6,079,497 A | 6/2000 | Johnston et al. | |
| 6,283,217 B1 | 9/2001 | Deaton | |
| 6,296,061 B1 * | 10/2001 | Leismer | E21B 34/101 166/386 |
| 2006/0162939 A1* | 7/2006 | Vick, Jr. | E21B 34/10 166/386 |
| 2014/0158362 A1 | 6/2014 | Megill et al. | |

* cited by examiner

*Primary Examiner* — David Carroll
(74) *Attorney, Agent, or Firm* — Scott Richardson; Parker Justiss, P.C.

(57) ABSTRACT

A subsurface safety valve for controlling fluid flow in a well conduit incorporating a pressure equalizing feature. The safety valve includes a body member having a longitudinal bore, a valve actuator having axial movement within the longitudinal bore and a valve that restricts flow through the longitudinal bore. An equalization fluid flow passageway provides a fluid path between the longitudinal bore above the valve and the longitudinal bore below the valve. An equalizing device is located within the equalization fluid flow passageway and configured to resist sand and debris effects on its operation, the equalizing device regulating flow through the equalization fluid flow passageway and operated by the valve actuator prior to opening the valve.

11 Claims, 8 Drawing Sheets

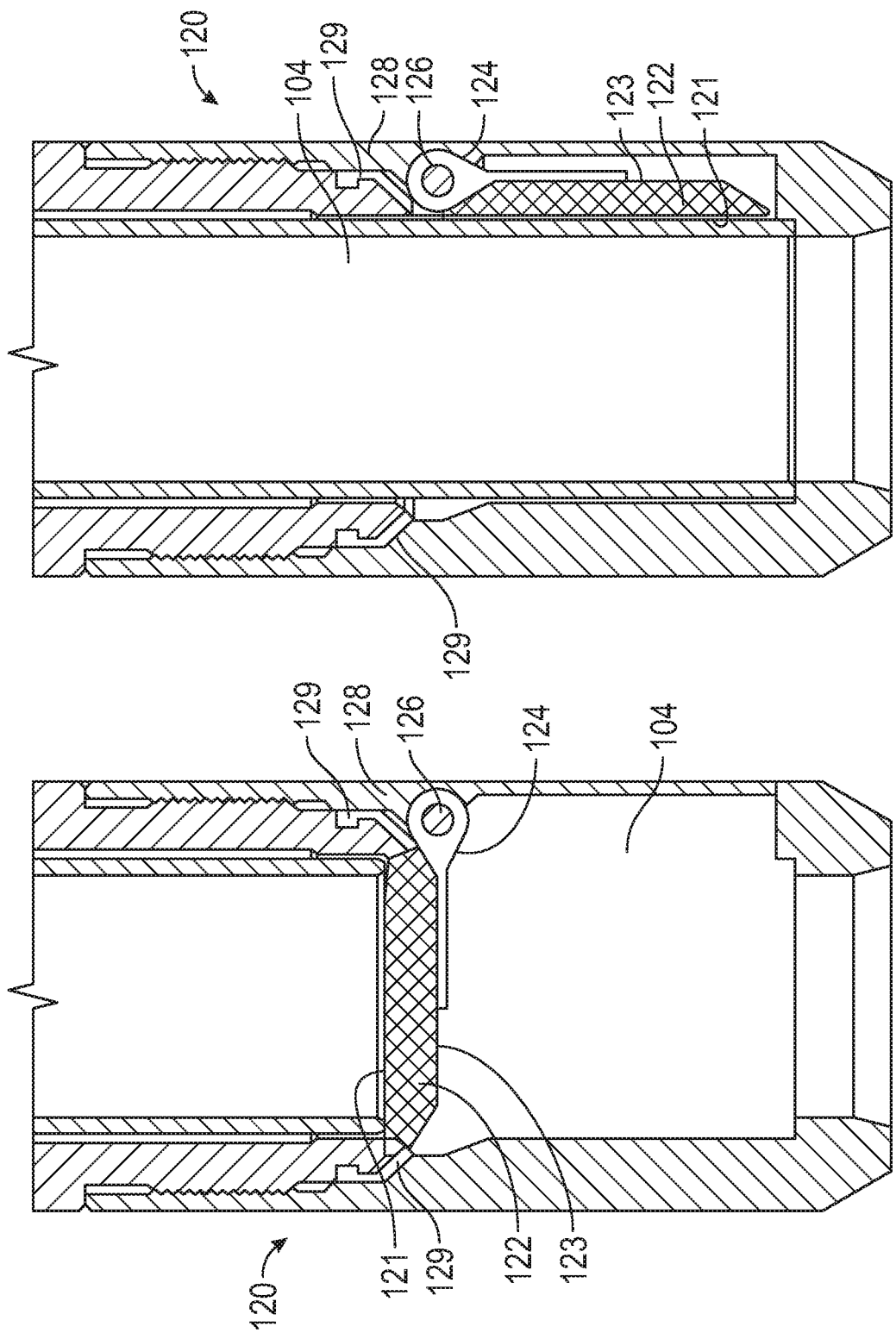

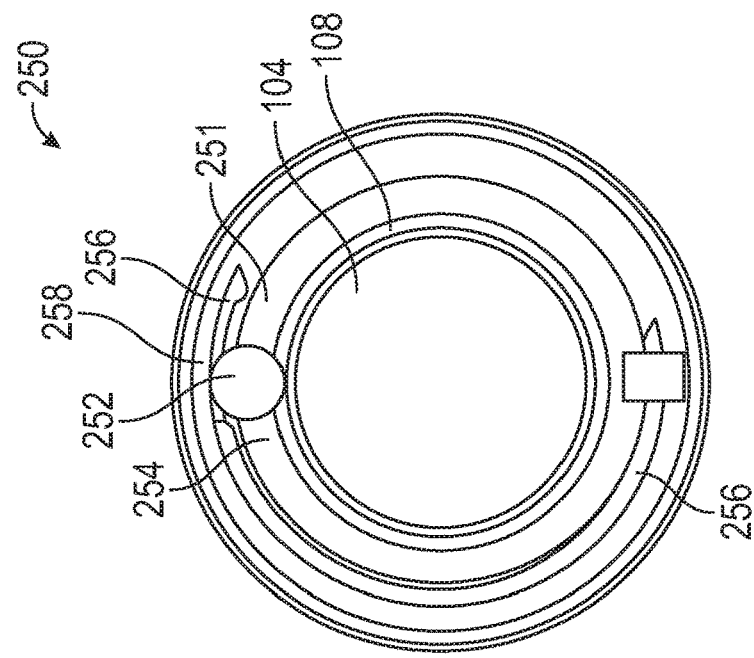
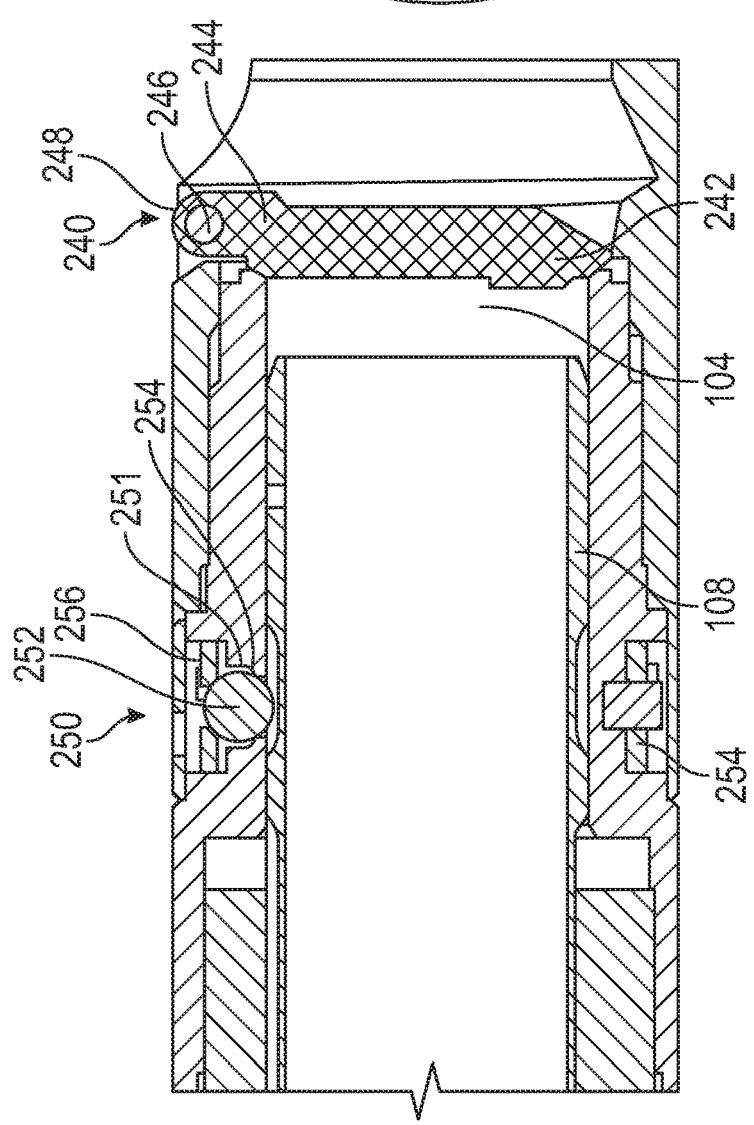
FIG. 12B
FIG. 12A

EQUALIZING DEVICE FOR SAFETY VALVES

CROSS-REFERENCE TO RELATED APPLICATION

This application claims priority to International Application No. PCT/US2019/017776, filed on Feb. 13, 2019, entitled "EQUALIZING DEVICE FOR SAFETY VALVES," which is commonly assigned with this application and incorporated herein by reference in its entirety.

BACKGROUND

Hydrocarbon producing wells are often completed in highly pressured producing formations. The portion of the well above the productive formation is usually lined with one or more steel casing. The annulus between the casing and the wellbore is typically filled with cement to stabilize the casing and prevent fluid flows within the annulus. The wellbore can then be drilled further to drill through the productive formation. A length of blank pipe may be run to provide a second casing (often referred to as a liner) in the wellbore below the existing casing to a location just above the productive formation. At least a portion of the annulus between the liner and the open hole below the casing is normally filled with cement to hold the liner in place and block annular flow of fluids around the liner. Following drilling of a wellbore a completion assembly can then be run below the liner, typically with a packer to seal with the liner, into the open hole zone to provide a flow path for produced fluids from the producing formation. A flow conduit for produced fluids within the cased portion of the well to the surface is typically a production tubing string.

Subsurface safety valves are commonly used in wells to prevent uncontrolled fluid flow through the well in the event of an emergency, such as to prevent a well blowout. Conventional safety valves typically use a valve element, such as a flapper, that is biased by a spring to a normally closed position, but can be retained in an open position by a flow tube positioned within the safety valve. Regardless of the type of valve element employed, there can be a problem with the reliable opening of such a valve when a significant pressure differential exists between the lower surface of the valve element and the upper surface.

A common form of actuator for a flapper valve is a sleeve that is driven downwardly by a piston shoulder through the imposition of a control fluid pressure supplied from the top of the wellhead. If a significant pressure differential exists across the flapper valve in its closed position, the amount of force required by the actuating sleeve may cause damage to the sleeve, the flapper valve, or the pivot mounting of the flapper valve.

When the flapper is in the closed position, well fluid pressure below the flapper acting upon a relatively large surface area of the flapper makes opening of the flapper difficult. This difficulty in opening cannot be easily overcome simply by increasing the force exerted against the flapper, because the relatively small cross-sectional area of the opening piston and cylinder assembly would require a fluid pressure that may burst the control line carrying hydraulic fluid from the earth's surface to the piston and cylinder assembly. The present disclosure provides a subsurface safety valve with an equalizing mechanism to allow the pressure above and below the flapper to equalize prior to the complete opening of the flapper.

BRIEF DESCRIPTION

Reference is now made to the following descriptions taken in conjunction with the accompanying drawings, in which:

FIG. 2 is a cross-sectional side view, showing a subsurface safety valve of the present disclosure, with the valve elements being shown in their closed position.

FIG. 3 is a view similar to FIG. 2 but illustrating the flapper valve in its open position.

FIG. 12A is a sectional view, showing a pressure equalizing element being disposed in its closed position in accordance with certain embodiments of the present disclosure.

FIG. 12B is a cross-sectional view of the pressure equalizing element of FIG. 12A taken through the ball, in accordance with certain embodiments of the present disclosure.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope or applications of the appended claims. In particular, an element associated with a particular embodiment should not be limited to association with that particular embodiment but should be assumed to be capable of association with any embodiment discussed herein.

Various elements of the embodiments are described with reference to their normal positions when used in a borehole. For example, a screen may be described as being below or downhole from a crossover. For vertical wells, the screen will actually be located below the crossover. For horizontal wells, the screen will be horizontally displaced from the crossover, but will be farther from the surface location of the well as measured through the well. Downhole or below as used herein refers to a position in a well farther from the surface location in the well.

Figure 1:
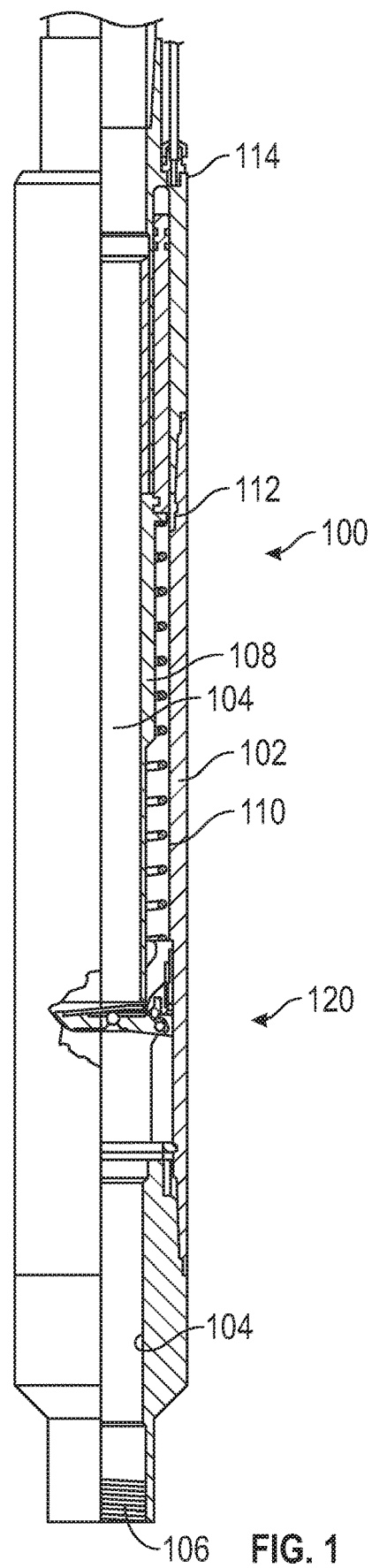
FIG. 1 is an elevational side view, partially in cross-section, showing a subsurface safety valve of the present disclosure.

Referring to the drawings in detail, wherein like numerals denote identical elements throughout the several views, there is shown in FIG. 1 a specific embodiment of a subsurface safety valve 100 constructed in accordance with the present invention. The subsurface safety valve 100 of this specific embodiment is comprised of a generally tubular body 102 with a longitudinal bore 104. Each end of the body 102 includes connections, such as threads 106, for interconnection with a pipe string (not shown) suspended within a wellbore (not shown). A sleeve member 108, usually referred to as a flow tube, optionally referred to as a valve actuator, is disposed within the bore 104 and is adapted for axial movement within the bore 104. The flow tube 108 includes a spring 110 that acts upon a shoulder 112 on the flow tube 108 biasing the flow tube 108 away from a flapper mechanism 120. The present disclosure is not intended to be limited to any particular means for biasing the flow tube 108 away from the flapper mechanism 120. A piston mechanism 114 disposed within the body member and moveable in response to application of hydraulic fluid can move the flow tube 108 within the longitudinal bore 104.

Referring to FIG. 2-3, the flapper mechanism 120 generally comprises a disc or flapper valve closure member 122 with an arm 124 on a peripheral edge thereof that is connected by a hinge 126 to an annular housing 128 mounted within the bore 104. FIG. 2 is shown in a closed position. The valve closure member 122 has an upper surface 121 and a lower surface 123. When closed the upper surface 121 makes contact with a seat 129 within the annular housing 128 the subsurface safety valve 100 is in a closed position.

When a downward force, such as mechanical or hydraulic, is exerted on the flow tube 108 that exceeds the force needed to overcome the spring 110 and open the flapper mechanism 120, the flow tube 108 moves downward to come into contact with, and open, the flapper valve closure member 122 as shown in FIG. 3. In the event that the applied force is decreased the spring 110 forces the flow tube 108 upwardly away from the flapper 120. The flapper 120 is then rotated by the hinge 126, and biased, into a closed position by action of a hinge spring (not shown) to permit the flapper 120 to establish a fluid seal to prevent fluid flow into the flow tube 108 as shown in FIG. 2.

When the flapper 120 has been closed, the pressure of fluids within the bore 104 upstream of (i.e., below) the closed flapper 120 increases and the pressure of the wellbore fluids downstream of (i.e., above) the closed flapper 120 decreases as the wellbore fluids remaining above the flapper 120 are recovered to the earth's surface through the pipe string. This creates a large pressure differential across the flapper 120 such that reopening of the flapper 120 becomes difficult. This difficulty in opening the flapper 120 cannot be easily overcome simply by increasing the force exerted against the lower surface of the flapper 120.

Figure 4:
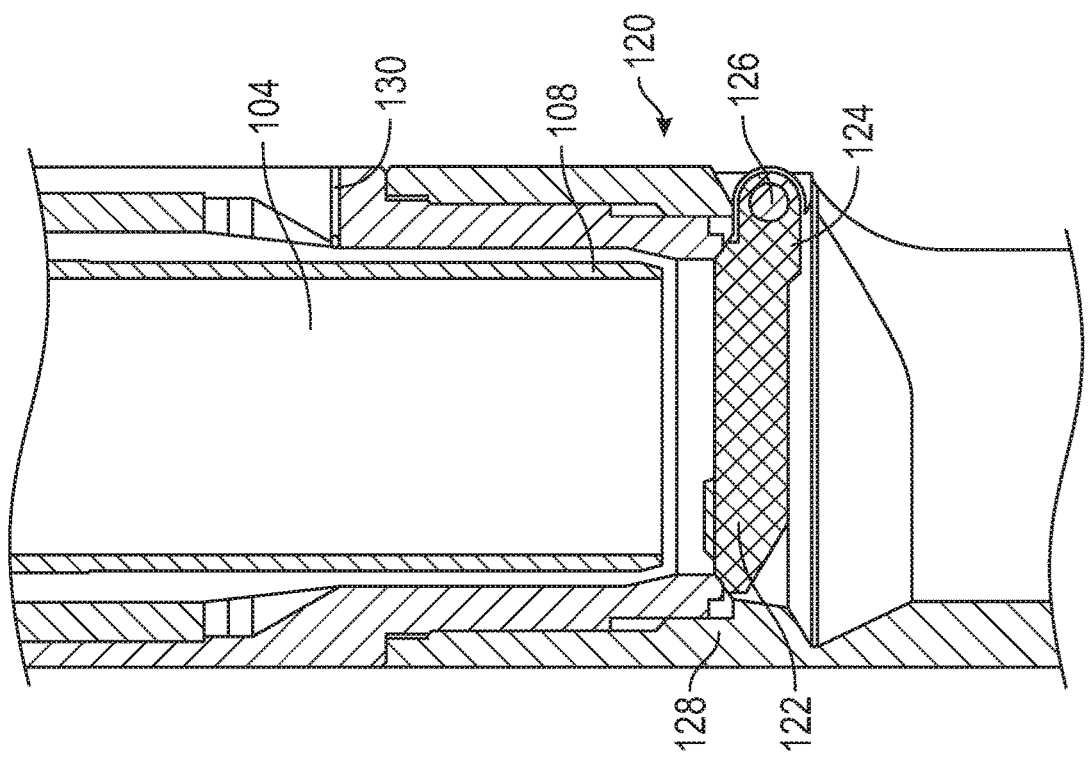
FIG. 4 is a sectional view of the flapper valve employed in FIG. 1, showing a pressure equalizing element.

Referring to FIG. 4, the flapper mechanism 120 comprises a disc or flapper valve closure member 122 with an arm 124 on a peripheral edge thereof that is connected by a hinge 126 to an annular housing 128 mounted within the bore 104. An equalizing device 130 is shown that enables the pressure of fluids within the bore 104 downstream of (i.e., above) the closed flapper 120 to be increased by flow of fluids from upstream of (i.e., below) the closed flapper 120.

Figure 5:
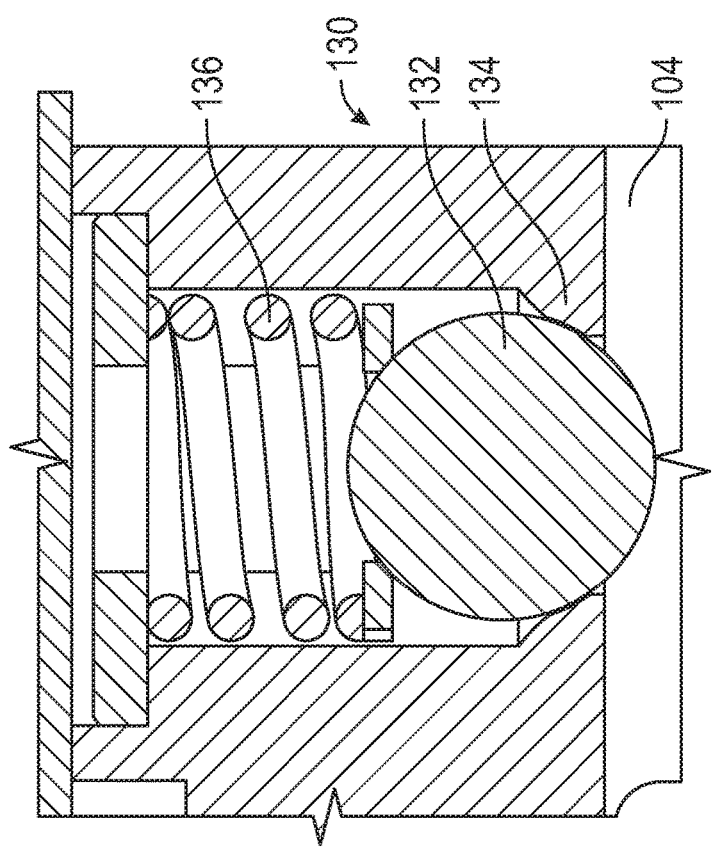
FIG. 5 is a cross-sectional side view, showing a pressure equalizing element being disposed in its closed position in accordance with certain embodiments of the present disclosure.

FIG. 5 illustrates an embodiment of an equalizing device 130 that includes a ball 132 that seals against a shoulder 134 and is held in a normally closed position by means of a spring mechanism 136. A portion of the ball 132 extends into the bore 104 when in a closed position. When a flow tube (not shown) is present in the bore 104 adjacent to the ball 132, the flow tube contacts the ball 132 making it move and compress the spring mechanism 136 and enabling fluid flow around the ball 132 and into the bore 104. In an embodiment the ball has a diameter of three-eighth (⅜) of an inch. A potential flaw with this embodiment can occur when the sealing area between the ball 132 and the shoulder 134 is obscured with debris. A single particle of sand can get wedged between the ball 132 and the shoulder 134 which can prevent the equalizing device 130 from working properly.

Figure 6:
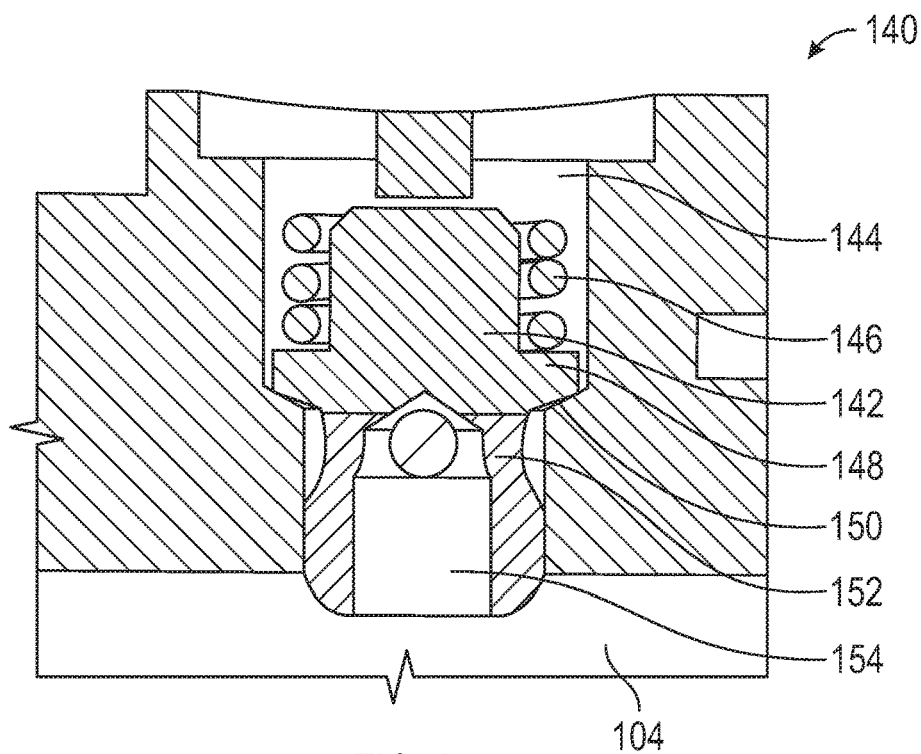
FIG. 6 is a cross-sectional side view, showing a pressure equalizing element being disposed in its closed position in accordance with certain embodiments of the present disclosure.

FIG. 6 illustrates an embodiment of an equalizing device 140 that includes a plunger 142 that is movable within a bore 144 and can be held in a normally closed position by means of a spring mechanism 146. A portion of the plunger 142 extends into the bore 104 when in a closed position. When in a closed position a lip 148 extending radially from the plunger 142 is in contact with a ledge 150 of the bore 144 forming a fluid tight seal. When a flow tube (not shown) is present in the bore 104 adjacent to the plunger 142, the flow tube contacts the plunger 142 making it move and compress the spring mechanism 146 and enabling fluid flow around the plunger 142 and into the bore 104. Fluid flow passes between the lip 148 and ledge 150 and can enter the plunger 142 through ports 152 in the side of the plunger 142 and pass into an inner hollow 154 of the plunger 142 and enter the bore 104. The respective angles of the lip 148 and ledge 150 are not the same reducing the contact area between them and providing more of a thin line contact area, thus reducing the chance of debris. The flow through the inner hollow 154 of the plunger 142 also reduces the chance of debris buildup.

Figure 7:
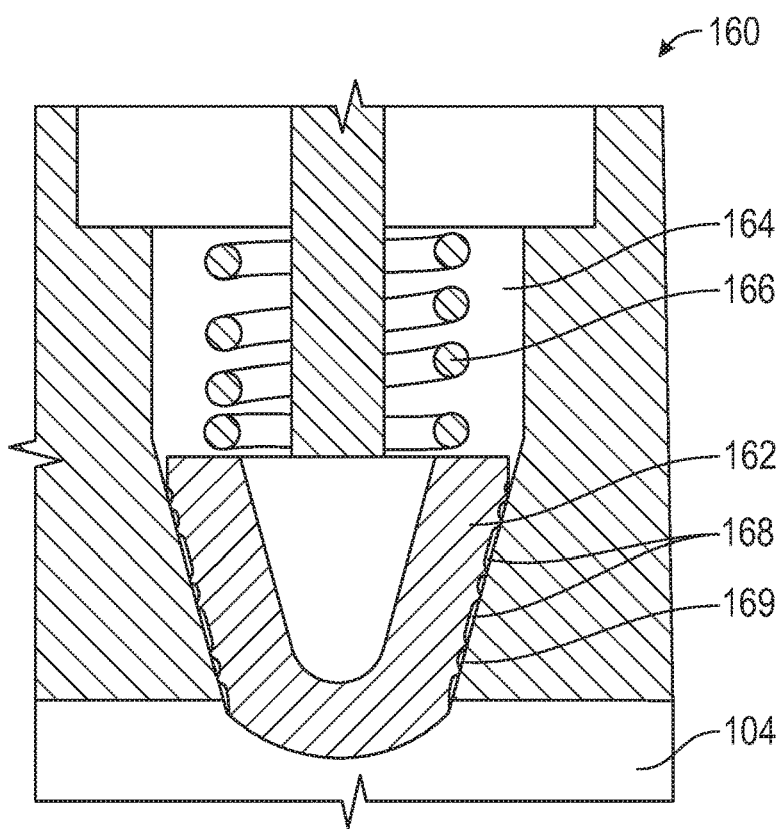
FIG. 7 is a cross-sectional side view, showing a pressure equalizing element being disposed in its closed position in accordance with certain embodiments of the present disclosure.

FIG. 7 illustrates an embodiment of an equalizing device 160 that includes a plunger 162 that is movable within a bore 164 and can be held in a normally closed position by means of a spring mechanism 166. A portion of the plunger 162 extends into the bore 104 when in a closed position. The plunger 162 uses an angle steep enough to have a mechanical advantage for crushing sand and shallow enough to not stick. This design has no shoulder for sand to build up on. When in a closed position multiple contact rings 168 extending radially from the plunger 162 is in contact with the tapered side 169 of the bore 164 forming a fluid tight seal. When a flow tube (not shown) is present in the bore 104 adjacent to the plunger 162, the flow tube contacts the plunger 162 making it move and compress the spring mechanism 166 and enabling fluid flow around the plunger 162 and into the bore 104. Fluid flow passes between the contact rings 168 and the tapered side 169 of the bore 164. In the embodiment shown there are six contact rings 168 that have a narrow contact points, the sum of which allows enough support for withstanding the differential pressure when closed while also providing a smaller contact area that imposes enough force to enable the crushing of any embedded sand.

Figure 8:
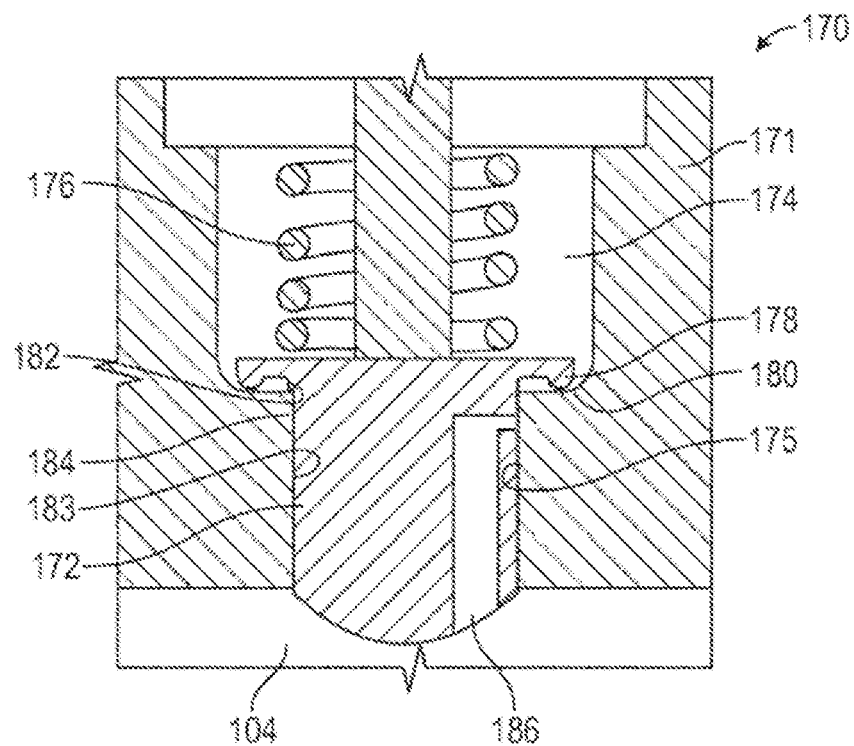
FIG. 8 is a cross-sectional side view, showing a pressure equalizing element being disposed in its closed position in accordance with certain embodiments of the present disclosure.

FIG. 8 illustrates an embodiment of an equalizing device 170 that includes a plunger 172 that is movable within a large bore 174 and small bore 175 of a base 171 and can be held in a normally closed position by means of a spring mechanism 176. A portion of the plunger 172 extends into the bore 104 when in a closed position. When in a closed position a ledge 182 on the plunger 172 located above a groove 184 forms a primary seal with a small bore wall 183 of base 171. Also when in a closed position a lip 178 extending radially from the plunger 172 is in contact with a ledge 180 of the bore 174 thus forming a secondary seal. In an embodiment the lip 178 makes contact with the ledge 180 before the ledge 182 on the plunger 172 forms the primary seal with the small bore wall 183 of base 171 by the close fit of the plunger 172 within the small bore 175 of base 171. In an embodiment the lip 178 is capable of flexing to ensure that a primary seal is made of ledge 182 against the small bore wall 183. When in a closed position the groove 184 is below the ledge 180 and the pressures above and below the plunger 172 can be non-equalized.

When a flow tube (not shown) is present in the bore 104 adjacent to the plunger 172, the flow tube contacts the plunger 172 making it move and compress the spring mechanism 176 and enabling fluid to flow under the lip 178, into groove 184, through one or more passageway 186 and into the bore 104. In an embodiment there are three grooves 184 and three passageways 186.

Figure 9:
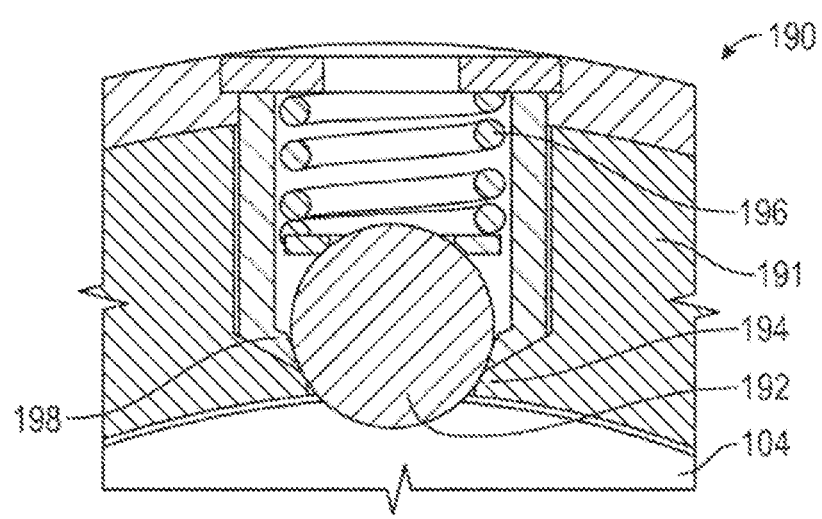
FIG. 9 is a cross-sectional side view, showing a pressure equalizing element being disposed in its closed position in accordance with certain embodiments of the present disclosure.

FIG. 9 illustrates an embodiment of an equalizing device 190 that includes a base material 191 and a ball 192 that seals against a shoulder 194 in the base 191 and is held in a normally closed position by means of a spring mechanism 196. There is an elastomeric secondary seal 198 that further seals against the ball 192 when in a closed position. A portion of the ball 192 extends into the bore 104 when in a closed position. When a flow tube (not shown) is present in the bore 104 adjacent to the ball 192, the flow tube contacts the ball 192 making it move and compress the spring mechanism 196 and enabling fluid flow around the ball 192 and into the bore 104. In an embodiment the elastomeric secondary seal 198 can be plastic, rubber, or other elastomeric material such as Teflon®. In an embodiment the ball has a diameter of three-eighth (⅜) of an inch. In an embodiment the elastomeric secondary seal 198 is cylindrical in shape to provide rigidity to the seal during equalization and to maintain proper orientation on the ball. Adequate clearance on the OD of the secondary seal 198 allows for thermal expansion at higher temperature values. In an embodiment the elastomeric secondary seal 198 is flexible enough so that sand or debris could be crushed into the secondary seal 198.

Figure 10:
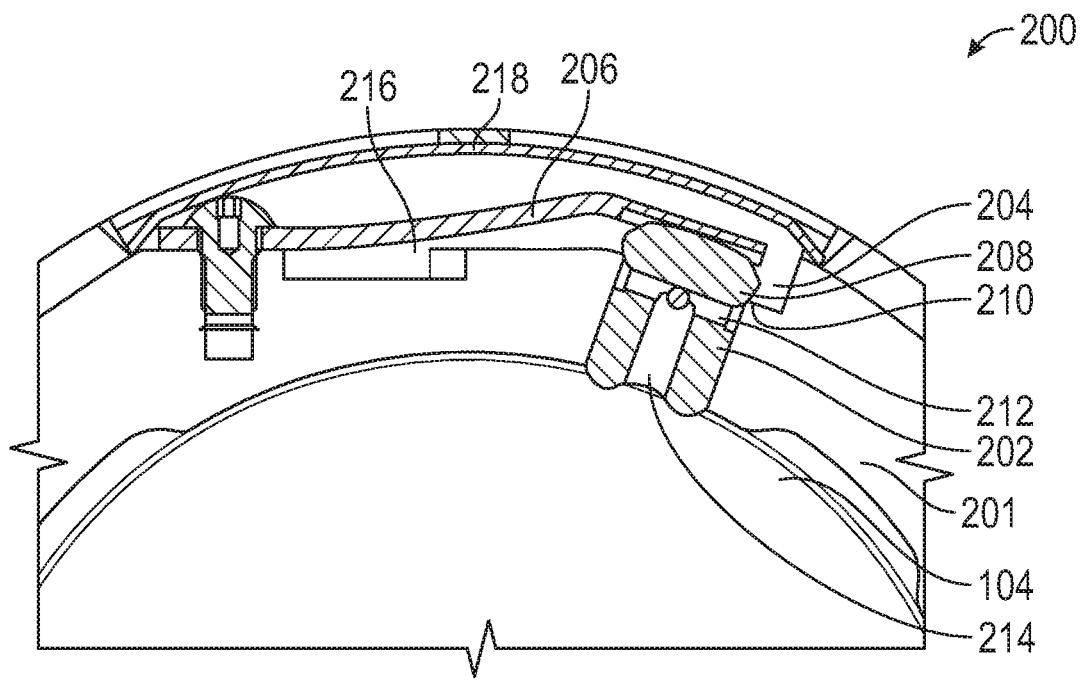
FIG. 10 is a cross-sectional side view, showing a pressure equalizing element being disposed in its closed position in accordance with certain embodiments of the present disclosure.

FIG. 10 illustrates an embodiment of an equalizing device 200 that includes base 201 and a poppet 202 that is movable within a bore 204 within the base 201 and can be held in a normally closed position by means of a leaf spring mechanism 206. A portion of the poppet 202 extends into the bore 104 when in a closed position. When in a closed position an extension 208 extending radially from the poppet 202 is in contact with an edge 210 of the base 201 forming a fluid tight seal. When a flow tube (not shown) is present in the bore 104 adjacent to the poppet 202, the flow tube contacts the poppet 202 making it move and lift the leaf spring mechanism 206 and enabling fluid flow through the poppet 202 and into the bore 104. The leaf spring mechanism 206 can include a bypass opening 216 that is opened when the leaf spring mechanism 206 is lifted. The bypass opening 216 can provide the fluid flow for the operation of the equalizing device 200. Optionally a filter 218 can be employed to protect the equalizing poppet 202 from sand and debris. The fluid flow passes through the filter 218, through the bypass opening 216, between the extension 208 and seat 210 and can enter the poppet 202 through ports 212 in the side of the poppet 202 and pass into an inner hollow 214 of the poppet 202 and enter the bore 104. The respective angles of the extension 208 and edge 210 are not the same reducing the contact area between them and providing more of a thin line contact area, thus reducing the chance of debris. The flow through the ports 212 and inner hollow 214 of the poppet 202 also reduces the chance of debris buildup.

Figure 11:
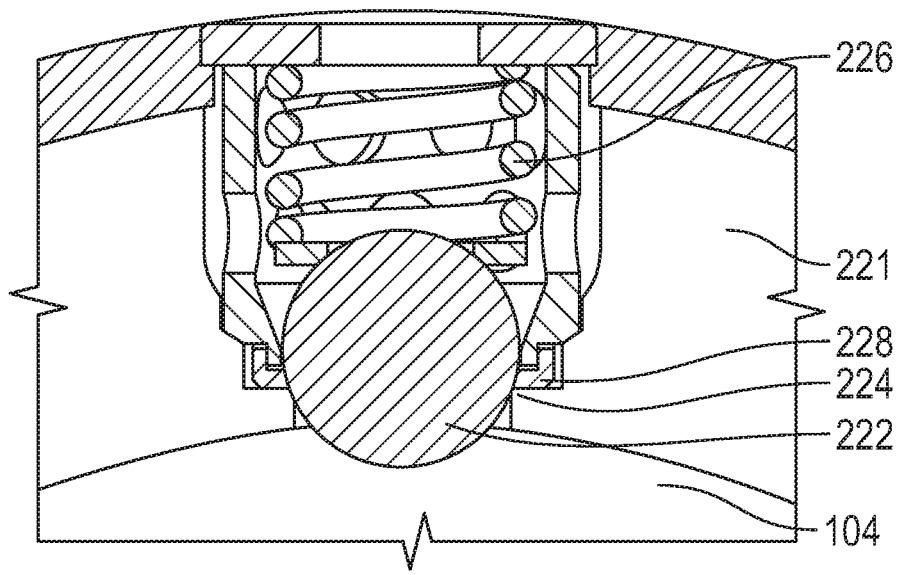
FIG. 11 is a cross-sectional side view, showing a pressure equalizing element being disposed in its closed position in accordance with certain embodiments of the present disclosure.

FIG. 11 illustrates an embodiment of an equalizing device 220 that includes a base material 221 and a ball 222 that seals against a shoulder 224 in the base 221 and is held in a normally closed position by means of a spring mechanism 226. There is an elastomeric secondary seal ring 228 that further seals against the ball 222 when in a closed position. A portion of the ball 222 extends into the bore 104 when in a closed position. When a flow tube (not shown) is present in the bore 104 adjacent to the ball 222, the flow tube contacts the ball 222 making it move and compress the spring mechanism 226 and enabling fluid flow around the ball 222 and into the bore 104. In an embodiment the elastomeric secondary seal ring 228 can be plastic, rubber, or other elastomeric material such as Teflon®. In an embodiment the ball has a diameter of three-eighth (⅜) of an inch. In an embodiment the elastomeric secondary seal ring 228 is cylindrical in shape to provide rigidity to the seal during equalization and to maintain proper orientation on the ball. Adequate clearance on the OD of the secondary seal ring 228 allows for thermal expansion at higher temperature values. In an embodiment the elastomeric secondary seal ring 228 is flexible enough so that sand or debris could be crushed into the secondary seal ring 228.

Referring to FIG. 12A, the flapper mechanism 240 comprises a disc or flapper valve closure member 242 with an arm 244 on a peripheral edge thereof that is connected by a hinge 246 to an annular housing 248 mounted around the bore 104. An equalizing device 250 is shown that enables the pressure of fluids within the bore 104 downstream of (i.e., above) the closed flapper 240 to be increased by flow of fluids from upstream of (i.e., below) the closed flapper 240. FIG. 12 B illustrates an embodiment of an equalizing device 250 that includes a base 251 and a ball 252 that seals against a shoulder 254 in the base 251 and is held in a normally closed position by means of a C shaped leaf spring mechanism 256. A portion of the ball 252 extends into the bore 104 when in a closed position. When a flow tube 108 is present in the bore 104 adjacent to the ball 252, the flow tube contacts the ball 252 making it move and lift the spring mechanism 256 and enabling fluid flow around the ball 252 and into the bore 104. The C shaped leaf spring mechanism 256 can include a slot 258 designed to align the ball 252 on the shoulder 254. The embodiment can include a filter to protect the equalizing ball 252 from sand and debris. In an embodiment the ball has a diameter of three-eighth (⅜) of an inch.

Figure 13B:
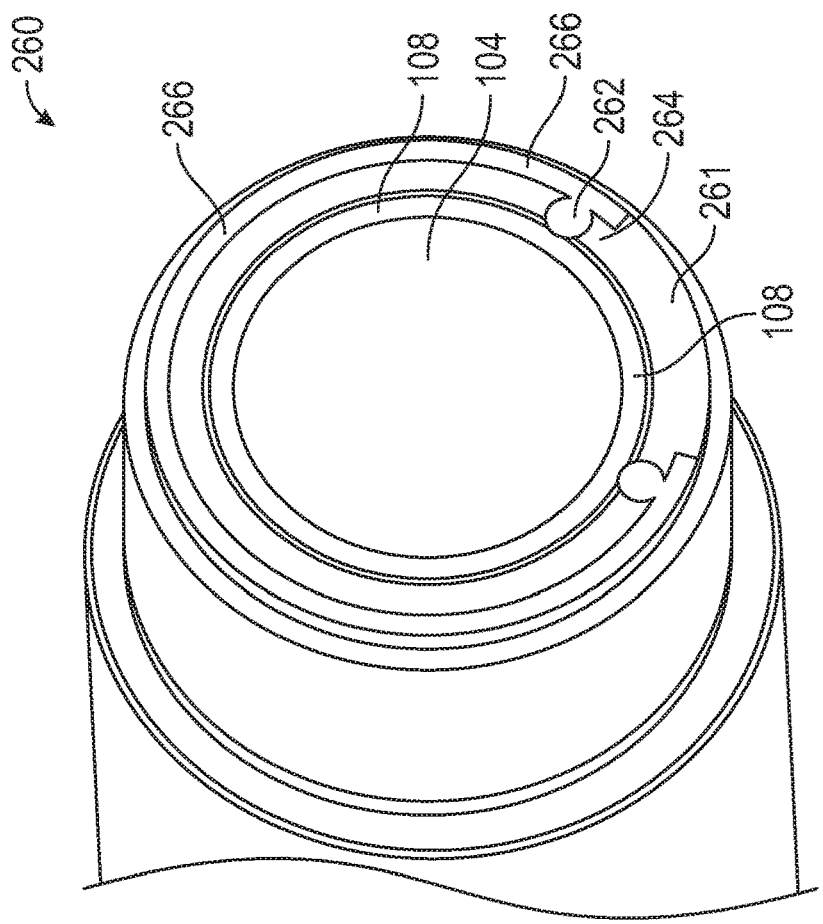
FIG. 13B is a cross-sectional view showing a pressure equalizing element being disposed in its open position in accordance with certain embodiments of the present disclosure.
Figure 13A:
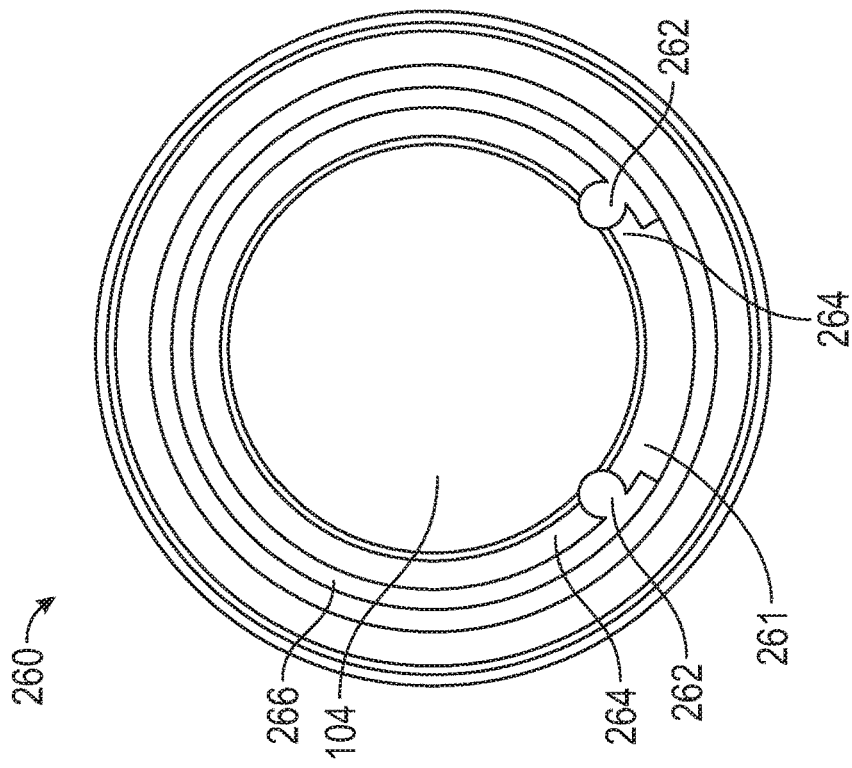
FIG. 13A is a cross-sectional view showing a pressure equalizing element being disposed in its closed position in accordance with certain embodiments of the present disclosure.

FIG. 13A illustrates an embodiment of an equalizing device 260 that includes a base 261 and one or more balls 262 that seal against a shoulder 264 in the base 261 and is held in a normally closed position by means of an omega shaped leaf spring mechanism 266. A portion of the balls 262 extends into the bore 104 when in a closed position, as shown in FIG. 13A. When a flow tube 108 is present in the bore 104 adjacent to the balls 262, as shown in FIG. 13B the flow tube contacts the balls 262 making it move and lift the spring mechanism 266 and enabling fluid flow around the balls 262 and into the bore 104. The embodiment can include a filter to protect the equalizing balls 262 from sand and debris.

The various equalizing devices of the present disclosure provide an apparatus for equalizing the pressures across the valve mechanism used in the subsurface safety valve.

An embodiment of the disclosure is an equalizing subsurface valve for controlling fluid flow in a well conduit, that includes a body member having a longitudinal bore extending through it, a valve actuator disposed for axial movement within the longitudinal bore, and a valve member mounted within the body member to control fluid flow through the longitudinal bore, the valve member having an upper surface, a lower surface, and a bore through it. There is a generally radially disposed opening in the body member providing an equalization fluid flow passageway between the longitudinal bore above the valve member and the longitudinal bore below the valve member. An equalizing device is located at least partially within the equalization fluid flow passageway and configured to resist sand and debris effects on its operation, the equalizing device biased to a closed position. When the valve actuator is in a first position the valve member is in a closed position and the equalizing device restricts the flow of fluid through the equalization fluid flow passageway. When the valve actuator is in a second position the valve member remains in a closed position and the equalizing device is at least partially opened enabling the flow of fluid through the equalization fluid flow passageway. When the valve actuator is in a third position a portion of the valve actuator is positioned within the valve member bore, the valve member is in an open position enabling fluid flow through the longitudinal bore.

In an embodiment the equalizing device includes a filter to resist sand and debris effects on its operation. The equalizing device can further include a closure member that, when in a closed position, is in contact with an equalizing device seat, restricting the flow of fluid through the equalization fluid flow passageway. The equalizing device seat can be a portion of the body member or can be an insert seal located on the body member. A portion of the closure member can extend within the longitudinal bore of the body member when the closure member is in the closed position, which can be moved when in contact with a valve actuator. The closure member can be biased to the closed position, such as with the use of a spring mechanism.

In an embodiment when the valve actuator is in the second position the valve actuator is in contact with the closure member and exerts force sufficient to overcome a closed position bias and place the closure member in an open position, enabling the flow of fluid through the equalization fluid flow passageway.

In an embodiment the equalizing device seat can include an elastomeric secondary seal. The elastomeric secondary seal can be cylindrical in shape to provide rigidity to the seal during equalization and to maintain proper orientation of the closure member. The elastomeric secondary seal can be sufficiently flexible to enable sand or debris to be crushed into the secondary seal and enable the closure member to close.

In an embodiment the closure member can include a plunger element movable within a portion of the equalization fluid flow passageway. The plunger can have a radial projection that seats upon contact with a body member ledge formed from a reduction in the diameter of the equalization fluid flow passageway.

In an optional embodiment the closure member radial projection has a contact surface and the body member ledge has a contact surface, the closure member radial projection contact surface seats with the body member ledge contact surface restricting fluid flow between them when the closure member is in the closed position. This forms a radial line of contact at a location where the fluid flowing through the equalization fluid flow passageway starts to pass across the closure member radial projection contact surface.

In an embodiment the closure member can optionally include one or more port in the side of the closure member under the closure member radial projection that forms a fluid path into an inner passageway within the closure member. The closure member ports and inner passageway can form a portion of the equalization fluid flow passageway when the closure member is in an open position. In an embodiment the closure member port forms a seal with a body member edge. When the closure member is in the closed position the closure member port can form a primary seal with the body member edge and the closure member radial projection is flexible and forms a secondary seal with the body member ledge.

In an embodiment the closure member includes a plunger movable within a portion of the equalization fluid flow passageway, the plunger having a plurality of radial projections that seat upon contact with a body member ledge formed from a reduction in the diameter of the equalization fluid flow passageway. The plurality of radial projections can form multiple radial line contacts between the radial projections and the body member ledge. These multiple radial line contacts can exert pressure to crush sand or debris located between the plurality of radial projections and the body member ledge.

An embodiment of the disclosure is an equalizing subsurface valve for controlling fluid flow in a well conduit that include a body member having a longitudinal bore extending through it, a valve actuator disposed for axial movement within the longitudinal bore, and a valve member mounted within the body member to control fluid flow through the longitudinal bore, the valve member having an upper surface, a lower surface, and a bore extending through it. A generally radially disposed opening in the body member provides an equalization fluid flow passageway between the longitudinal bore above the valve member and the longitudinal bore below the valve member. An equalizing device is located at least partially within the equalization fluid flow passageway and configured to resist sand and debris effects on its operation, the equalizing device biased to a closed position. When the valve actuator is in a first position the valve member is in a closed position and the equalizing device restricts the flow of fluid through the equalization fluid flow passageway. When the valve actuator is in a second position the valve member remains in a closed position and the equalizing device is at least partially opened enabling the flow of fluid through the equalization fluid flow passageway. When the valve actuator is in a third position a portion of the valve actuator is positioned within the valve member bore, the valve member is in an open position enabling fluid flow through the longitudinal bore. The equalizing device includes a filter to resist sand and debris effects on its operation. The equalizing device further includes a closure member that, when in a closed position, is in contact with an equalizing device seat, restricting the flow of fluid through the equalization fluid flow passageway. A portion of the closure member extends within the longitudinal bore of the body member when the closure member is in the closed position and is biased to the closed position.

It should be understood that the operations shown performed by embodiments discussed herein and are not meant to be limiting. Embodiments discussed herein could perform alternate operations different than those discussed but achieving substantially similar results.

The text above describes one or more specific embodiments of a broader disclosure. The disclosure also is carried out in a variety of alternate embodiments and thus is not limited to those described here. The foregoing description of an embodiment of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims appended hereto.

What is claimed is:

1. An equalizing subsurface valve for controlling fluid flow in a well conduit, comprising:
   a body member having a longitudinal bore extending therethrough;
   a valve actuator disposed for axial movement within the longitudinal bore;
   a valve member mounted within the body member to control fluid flow through the longitudinal bore, the valve member having an upper surface, a lower surface, and a bore therethrough;
   a generally radially disposed opening in the body member providing an equalization fluid flow passageway between the longitudinal bore above the valve member and the longitudinal bore below the valve member;
   an equalizing device located at least partially within the equalization fluid flow passageway and configured to resist sand and debris effects on its operation, the equalizing device biased to a closed position;
   wherein when the valve actuator is in a first position the valve member is in a closed position and the equalizing device restricts the flow of fluid through the equalization fluid flow passageway;
   wherein when the valve actuator is in a second position the valve member remains in a closed position and the equalizing device is at least partially opened enabling the flow of fluid through the equalization fluid flow passageway;
   wherein when the valve actuator is in a third position a portion of the valve actuator is positioned within the valve member bore, the valve member is in an open position enabling fluid flow through the longitudinal bore, wherein the equalizing device further comprises a closure member that, when in a closed position, is in contact with an equalizing device seat comprising a portion of the body member, restricting the flow of fluid through the equalization fluid flow passageway, wherein the closure member comprises a plunger movable within a portion of the equalization fluid flow passageway, the plunger having a radial projection that seats upon contact with a body member ledge formed from a reduction in the diameter of the equalization fluid flow passageway, wherein the closure member further comprises a closure member port in the side of the closure member under the closure member radial projection that form a fluid path into an inner passageway within the closure member, the closure member port and inner passageway forming a portion of the equalization fluid flow passageway when the closure member is in an open position, and further wherein the closure member port does not form a portion of the equalization fluid flow passageway when the closure member is in the closed position.

2. The equalizing subsurface valve of claim 1 wherein the equalizing device comprises a filter to resist sand and debris effects on its operation.

3. The equalizing subsurface valve of claim 1 wherein a portion of the closure member extends within the longitudinal bore of the body member when the closure member is in the closed position.

4. The equalizing subsurface valve of claim 1 wherein the closure member is biased to the closed position.

5. The equalizing subsurface valve of claim 4 wherein the closure member is biased to the closed position with a spring mechanism.

6. The equalizing subsurface valve of claim 1 wherein when the valve actuator is in the second position the valve actuator is in contact with and exerts force on the closure member sufficient to overcome a closed position bias and place the closure member in an open position, enabling the flow of fluid through the equalization fluid flow passageway.

7. The equalizing subsurface valve of claim 1 wherein the equalizing device seat further comprises an elastomeric secondary seal.

8. The equalizing subsurface valve of claim 7 wherein the elastomeric secondary seal is cylindrical in shape to provide rigidity to the seal during equalization and to maintain proper orientation of the closure member.

9. The equalizing subsurface valve of claim 7 wherein the elastomeric secondary seal is sufficiently flexible to enable sand or debris to be crushed into the secondary seal and enable the closure member to close.

10. The equalizing subsurface valve of claim 1 wherein the closure member radial projection has a contact surface and the body member ledge has a contact surface, wherein the closure member radial projection contact surface seats with the body member ledge contact surface restricting fluid flow between them when the closure member is in the closed position, forming a radial line of contact at a location where the fluid flowing through the equalization fluid flow passageway starts to pass across the closure member radial projection contact surface.

11. An equalizing subsurface valve for controlling fluid flow in a well conduit, comprising:
   a body member having a longitudinal bore extending therethrough;
   a valve actuator disposed for axial movement within the longitudinal bore;
   a valve member mounted within the body member to control fluid flow through the longitudinal bore, the valve member having an upper surface, a lower surface, and a bore therethrough;
   a generally radially disposed opening in the body member providing an equalization fluid flow passageway between the longitudinal bore above the valve member and the longitudinal bore below the valve member;
   an equalizing device located at least partially within the equalization fluid flow passageway and configured to resist sand and debris effects on its operation, the equalizing device biased to a closed position;
   wherein when the valve actuator is in a first position the valve member is in a closed position and the equalizing device restricts the flow of fluid through the equalization fluid flow passageway;

wherein when the valve actuator is in a second position the valve member remains in a closed position and the equalizing device is at least partially opened enabling the flow of fluid through the equalization fluid flow passageway;

wherein when the valve actuator is in a third position a portion of the valve actuator is positioned within the valve member bore, the valve member is in an open position enabling fluid flow through the longitudinal bore, wherein the equalizing device further comprises a closure member that, when in a closed position, is in contact with an equalizing device seat comprising a portion of the body member, wherein the closure member comprises a plunger movable within a portion of the equalization fluid flow passageway, the plunger having a plurality of radial projections that seat upon contact with a body member ledge formed from a reduction in the diameter of the equalization fluid flow passageway.

\* \* \* \* \*